US008819137B2

(12) United States Patent
Wang et al.

(10) Patent No.: US 8,819,137 B2
(45) Date of Patent: Aug. 26, 2014

(54) SYSTEM AND METHOD FOR SHARING MOBILE INTERNET SERVICE

(75) Inventors: Zhiping Wang, Shenzhen (CN); Ruchuan Wang, Shenzhen (CN); Zhiyuan Li, Shenzhen (CN); He Xu, Shenzhen (CN)

(73) Assignee: ZTE Corporation, Shenzhen, Guangdong Providence (CN)

( * ) Notice: Subject to any disclaimer, the term of this patent is extended or adjusted under 35 U.S.C. 154(b) by 109 days.

(21) Appl. No.: 13/537,233

(22) Filed: Jun. 29, 2012

(65) Prior Publication Data

US 2012/0265822 A1 Oct. 18, 2012

Related U.S. Application Data

(63) Continuation of application No. PCT/CN2010/072953, filed on May 19, 2010.

(30) Foreign Application Priority Data

Dec. 31, 2009 (CN) .......................... 2009 1 0261873

(51) Int. Cl.
*G06F 15/16* (2006.01)
*H04L 29/08* (2006.01)
*H04W 4/00* (2009.01)
*H04W 92/18* (2009.01)
*H04W 84/18* (2009.01)

(52) U.S. Cl.
CPC ............... *H04L 67/104* (2013.01); *H04W 4/00* (2013.01); *H04W 92/18* (2013.01); *H04W 84/18* (2013.01)
USPC ............................. 709/204; 709/227; 709/229

(58) Field of Classification Search
CPC .... G06F 9/4862; H04L 41/048; H04L 67/104
USPC .......... 709/204, 217, 228, 203, 206, 218, 219, 709/223, 224, 226, 227, 229
See application file for complete search history.

(56) References Cited

U.S. PATENT DOCUMENTS

| 2008/0276091 | A1* | 11/2008 | Welin et al. ................... 713/170 |
| 2009/0313353 | A1 | 12/2009 | Lou ................................. 709/219 |
| 2010/0095009 | A1* | 4/2010 | Matuszewski et al. ........ 709/228 |
| 2011/0246608 | A1* | 10/2011 | Wu et al. ........................ 709/217 |

FOREIGN PATENT DOCUMENTS

| CN | 1596407 | A | 3/2005 | ............. G06F 17/30 |
| CN | 1744503 | A | 3/2006 | ............. H04L 12/00 |
| CN | 101075954 | A | 11/2007 | ............. H04L 12/56 |
| CN | 101184016 | A | 5/2008 | ............. H04L 12/46 |
| CN | 101567769 | A | 10/2009 | ............. H04L 1/18 |

* cited by examiner

Primary Examiner — Quang N Nguyen

(57) ABSTRACT

This disclosure discloses a system and a method for sharing mobile internet service. The system comprises: a mobile client node configured to send a message for requesting a shared service; and a mobile agent peer-to-peer network including multiple mobile agent peer-to-peer nodes which are configured to receive the message from the mobile client node and provide for the mobile client node the shared service requested by the message. This disclosure uses the mobile agent peer-to-peer node to receive from the mobile client node the message for requesting the shared service and provide the shared service according to message, to solve the problem that transmission and sharing of large files among mobile terminals can not be implemented in the related art, and thus to implement the sharing of resources among mobile terminals.

11 Claims, 6 Drawing Sheets

SYSTEM AND METHOD FOR SHARING MOBILE INTERNET SERVICE

This is a continuation of International Application PCT/CN2010/072953, with an International Filing Date of May 19, 2010, which claims priority to Chinese Application No. 200910261873.7, filed Dec. 31, 2009, each of which is incorporated by reference.

FIELD OF THE INVENTION

This disclosure relates to the field of communication, and in particular to a system and a method for sharing mobile internet service.

BACKGROUND OF THE INVENTION

In the existing mobile network, a mobile terminal generally downloads a file by connecting to a file server. However, since each mobile terminal is located behind a Gateway General Packet Radio Service Supporting Node (GGSN), the terminals can not transmit data directly with each other.

In addition, terminals are greatly different from a fixed Internet node device in terms of the limitation on the battery life, the Central Processing Unit (CPU) processing capability, the available memory space of a mobile device and so on. Thus transmission and sharing of large files among mobile terminals can not be implemented.

SUMMARY OF THE INVENTION

The main object of this disclosure is to provide a system and a method for sharing mobile internet service, so as to at least solve the problem that transmission and sharing of large files among mobile terminals can not be implemented in the related art.

In order to achieve the object above, according to one aspect of this disclosure, a system for sharing mobile internet service is provided, comprising: a mobile client node configured to send a message for requesting a shared service; and a mobile agent peer-to-peer network, including multiple mobile agent peer-to-peer nodes, configured to receive the message from the mobile client node and provide the shared service requested by the message for the mobile client node.

Further, the mobile agent peer-to-peer network further comprises: mobile agent super nodes, configured to receive the request message from a mobile agent peer-to-peer node and provide index information of a shared resource corresponding to the shared service to the mobile agent peer-to-peer node, wherein the index information includes a file name and a file Hash value, and a mobile agent peer-to-peer node is further configured to obtain the shared service from a resource node according to the index information provided by the mobile agent super node.

Further, the resource node includes network elements of at least one of: mobile client node, mobile agent peer-to-peer node and other peer-to-peer nodes.

Further, the mobile agent super node is further configured to obtain the index information of the shared resource corresponding to the shared service from another mobile agent super node in the mobile agent peer-to-peer network, and to provide the obtained index information to the mobile agent peer-to-peer node.

Further, the mobile agent super node is further configured to maintain information of the mobile client node and the mobile agent peer-to-peer node according to a Distributed Hash table (DHT), wherein the DHT is configured to provide communication information of the mobile client node and the mobile agent peer-to-peer node.

Further, the shared service includes at least one of: distribution of shared resource, search of shared resource and download of shared resource.

In order to achieve the object above, according to another aspect of this disclosure, a method for sharing mobile internet service is provided, comprising steps of: receiving, by a mobile agent peer-to-peer node in a mobile agent peer-to-peer network, from a mobile client node a message for requesting a shared service; and the mobile agent peer-to-peer node providing for the mobile client node the shared service requested by the message.

Preferably, in a condition that the message is used to request to publish a shared resource, the step of the mobile agent peer-to-peer node providing for the mobile client node the shared service requested by the message comprises steps of: the mobile agent peer-to-peer node saving shared resource information included in the message, and sending a resource backup message to a resource node, wherein the resource backup message carries the shared resource information; the resource node receiving the resource backup message sent from the mobile agent peer-to-peer node, backuping the shared resource information in a memory space, and after the backup is successful, sending index information of the shared resource information to a mobile agent super node; and the mobile agent super node receiving the index information and updating an online list of shared resources according to the index information of the shared resource.

Preferably, in a condition that the message is used to request to search for a shared resource, the step of the mobile agent peer-to-peer node providing for the mobile client node the shared service requested by the message comprises steps of: forwarding from the mobile client node to a mobile agent super node, by the mobile agent peer-to-peer node, the message for requesting to search for a shared resource; searching, by the mobile agent super node, for the shared resource information in a local resource index database according to the message; if the shared resource information is found, returning a node information list carrying the shared resource information to the mobile agent peer-to-peer node; and if the shared resource information is not found, querying other mobile agent super nodes and returning a node information list carrying the shared resource information to the mobile agent peer-to-peer node after the other mobile agent super nodes return the shared resource information; and the mobile agent peer-to-peer node receiving the node information list returned from the mobile agent super node and forwarding the node information list to the mobile client node.

Preferably, in a condition that the message is used to request to download a shared resource, the step of the mobile agent peer-to-peer node providing for the mobile client node the shared service requested by the message comprises steps of: the mobile agent peer-to-peer node receiving from the mobile client node the message for requesting to download a shared source; and the mobile agent peer-to-peer node requesting download from a resource node possessing the shared resource according to the message, executing the download, and after finishing the download, sending the downloaded shared resource to the mobile client node.

This disclosure has the following benefits:

by using a mobile agent peer-to-peer node to receive a message for requesting a shared service from a mobile client node and provide the shared service according to the message, multiple mobile terminals can be connected to a mobile internet network through a P2P network to realize sharing of resources among mobile terminals. In addition, based on a mobile agent mechanism, the system and the method for sharing mobile internet service in this disclosure can save the network bandwidth of the mobile internet, enrich the service content of the mobile internet and enhance the experience of a user enjoying in the mobile internet.

BRIEF DESCRIPTION OF THE DRAWINGS

The drawings described herein are for a better understanding of this disclosure, and they constitute a part of the application. The embodiments of this disclosure and the description thereof are used to illustrate this disclosure but not to unduly limit this disclosure. In the drawings.

DETAILED DESCRIPTION OF THE EMBODIMENTS

This disclosure is described below in detail with reference to the drawings and in conjunction with embodiments. It should be noted that the embodiments in the application and the characteristics of the embodiments can be combined with each other if no conflict is caused.

System Embodiments

Figure 1:
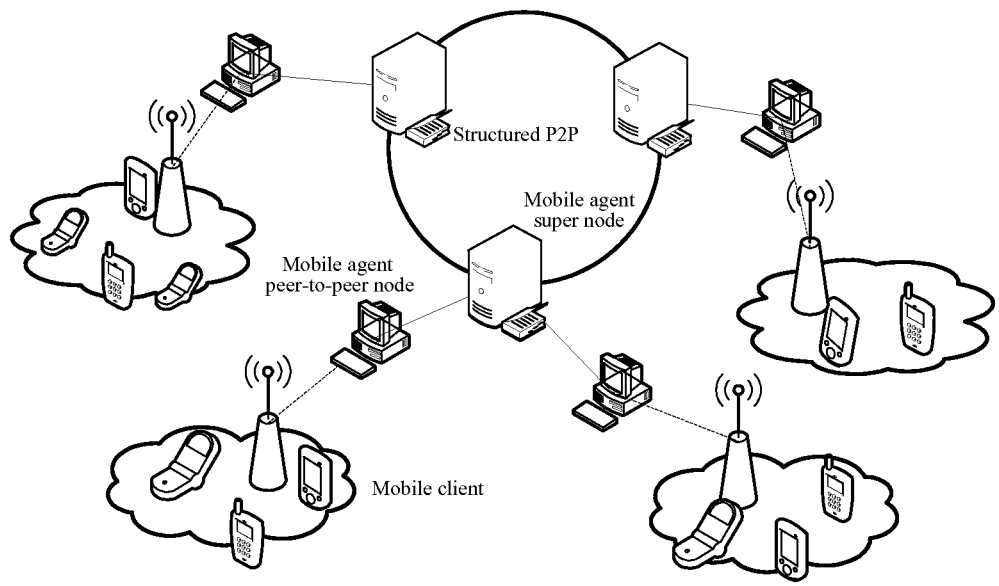
FIG. 1 shows a schematic diagram of an application network structure of a system for sharing mobile internet service according to the embodiment of this disclosure.

According to the embodiment of this disclosure, a system for sharing mobile internet service is provided. FIG. 1 shows a schematic diagram of an application network structure of a system for sharing mobile internet service according to the embodiment of this disclosure. As shown in FIG. 1, the system for sharing mobile internet service according to the embodiment of this disclosure comprises: a mobile client node, configured to send a message for requesting a shared service; and a mobile agent peer-to-peer network, including multiple mobile agent peer-to-peer nodes, configured to receive the message from the mobile client node and provide for the mobile client node the shared service requested by the message.

In the related art, due to the problems of network environment and capability of terminals per se, the terminals can not perform data communication with each other directly. Thus transmission and sharing of large files among mobile terminals can not be implemented. However, in the embodiment of this disclosure, by using a mobile agent peer-to-peer node to receive from a mobile client node a message for requesting a shared service and provide the shared service according to the message, multiple mobile terminals can be connected to a mobile internet network through a P2P network to realize resource sharing among mobile terminals.

Preferably, the mobile agent peer-to-peer network further comprises: mobile agent super nodes, configured to receive the request message from the mobile agent peer-to-peer node and provide the index information of a shared resource corresponding to the shared service to the mobile agent peer-to-peer node, wherein the index information includes a file name and a file Hash value, and the mobile agent peer-to-peer node is further configured to obtain the shared service from a resource node according to the index information provided by the mobile agent super node.

In this embodiment, the mobile agent peer-to-peer node is a core part of a mobile internet content sharing system based on the mobile agent and P2P technology. It assists the mobile client and the content provider to achieve publication, search, storage and download functions of resources in the system. The mobile agent super node functions as a super node of the P2P network in the mobile internet content sharing system based on the mobile agent and P2P technology, which achieves the resource index function of the mobile client and the mobile internet content provider. The mobile client is classified as a broadband access mobile client or a narrowband access mobile client, wherein the broadband wireless access mode comprises: Wireless Local Area Network (WLAN), 3G, General Packet Radio Service (GPRS), Enhanced Data Rate for Global System for Mobile Communication (GSM) Evolution (EDGE), and other radio access modes. No matter what access mode it is, a mobile agent peer-to-peer node is established for each mobile client accessing the mobile internet through a radio access point. The difference is that the narrowband access mobile client downloads and shares resources through the mobile agent peer-to-peer node, while the broadband access mobile client, used as the mobile client peer-to-per node by itself, also can participate in the sharing and download of resources, besides downloading and sharing resources through the mobile agent peer-to-peer node.

The structure is described below in detail.

The mobile client node, connected to the mobile internet through a radio access point, is configured to realize function of the mobile client and send a message for requesting a shared service.

The mobile client node above is mainly applied in a mobile terminal, such as Personal Digital Assistant (PDA), cell phone, net book and other mobile terminals which access the mobile internet through a wireless way such as WLAN, 3G, GPRS, and EDGE. In this case, the mobile client node accessing the network through the access mode such as WLAN and 3G is called a mobile peer-to-peer node in the system. The mobile peer-to-peer node provides services for other mobile client nodes in the system while enjoying the services provided by the system. A radio access device with GPRS, EDGE and other access modes establishes a mobile agent peer-to-peer node for the mobile client node to which the radio access device belongs, so that the mobile client node can access the system to obtain services.

The mobile agent peer-to-peer node is deployed in the mobile internet to receive a message from the mobile client node, save the content of a share service and provide the shared service according to the message, that is, mainly providing the services of node finding, content search and content access for the mobile client node.

The mobile agent peer-to-peer node above is mainly applied to the narrowband access mobile client node. Due to the defects of low radio link bandwidth and slow transmission rate, it is difficult for the narrowband access mobile client to provide high-quality content services for other users in the system. Thus, a mobile agent peer-to-peer node is established to make up for it.

Preferably, the system for sharing mobile internet service in the embodiment further comprises: mobile agent super nodes, mainly applied to resource index and node finding, and configured to maintain the mobile client node and the mobile agent peer-to-peer node accessing the mobile internet. For example, the mobile agent super node is configured to receive a request message from the mobile agent peer-to-peer node and provide the index information of a shared resource corresponding to the shared service to the mobile agent peer-to-peer node, wherein the index information includes a file name and a file Hash value. In this condition, the mobile agent peer-to-peer node is further configured to obtain the shared service from a resource node according to the index information provided by the mobile agent super node. The mobile agent super nodes above self-organize (form by themselves) a structured P2P overlay network using a structured P2P protocol to communicate with each other. Thus, the resource index information needed by a mobile client node can be quickly and effectively found when it is not recorded in the local mobile agent super node.

Specifically, the mobile agent super node maintains the mobile client node and the mobile agent peer-to-peer node according to a DHT, wherein the DHT is used to provide the communication information of the mobile client node and the mobile agent peer-to-peer node. That is to say, the intercommunication between individual mobile agent super nodes is kept, using the DHT. Preferably, in the embodiment, a mainstream DHT can be adopted, such as Chord, KAD, Pastry and so on. At present, there are many modifications for Chord, and the performance of Chord is good. When using Chord as the DHT in the system and determining the distance between a user node and a super node through the DHT, geographical-location-related information is added to guarantee that the resource node found by the user is the nearest geographical location, so as to enhance the system search performance.

Further, the mobile agent super node is further configured to maintain and provide the index information of a shared resource corresponding to the shared service of all mobile client nodes in the mobile internet. In this case, the index information comprises: a file name and a file Hash value. Preferably, the index information can further comprise: file name and file size of the shared resource (such as video, audio and document) which can be downloaded, and device type, network protocol IP address and port number of all mobile client nodes which provide the shared resource. Specifically, the mobile agent super node is configured to store the shared file index and locate the storage node of the file content according to the index.

In operation, the mobile agent peer-to-peer node stores in the local storage space the content required to be published by the mobile terminal whose agent is the mobile agent peer-to-peer node. And the mobile agent peer-to-peer node is surrogated to handle various service requests of the mobile terminal, such as content publication, content download, content search, content publication cancellation and so on. That is to say, the mobile agent peer-to-peer node is further configured to obtain the shared service from the corresponding resource node according to the index information provided by the mobile agent super node and provide the shared service, wherein the shared service includes at least one of: publication of shared resource, search of shared resource and download of shared resource.

The resource node above accesses a content sharing platform to provide the served content, wherein the resource node at least comprises one of the following network elements: mobile client node, mobile agent peer-to-peer node and other peer-to-peer nodes.

Preferably, the mobile agent super node is further configured to obtain the index information of the shared resource corresponding to the shared service from another mobile agent super node in the mobile agent peer-to-peer network, and to provide the obtained index information to the mobile agent peer-to-peer node.

Figure 2:
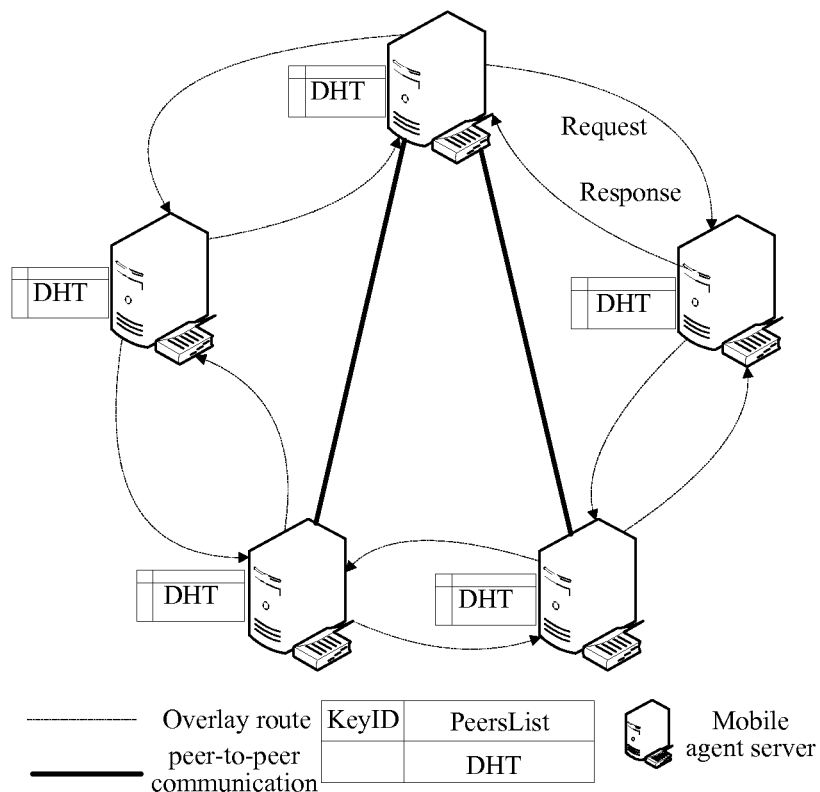
FIG. 2 shows a schematic diagram of a structure of an overlay network among mobile agent servers according to the embodiment of this disclosure.

FIG. 2 shows a schematic diagram of a structure of an overlay network among the mobile agent servers (in this embodiment, the mobile agent server is the mobile agent super node) according to the embodiment of this disclosure. As shown in FIG. 2, a structured P2P overlay network is self-organized between all the mobile agent super nodes using a structured P2P protocol. The structured P2P uses a DHT to store (KeyID, PeersList), wherein the KeyID is the identifier of the shared resource required to be searched for, PeersList is the index information of Peers providing the shared resource. The inter-operation between the mobile agent super nodes mainly includes two operations: request and response. When the resource index information needed by the mobile client node can not be found in the local mobile agent server, the local mobile agent server (that is, the mobile agent super node) sends a request message to other mobile agent super nodes with the format Request (KeyID). When a mobile agent super node receives the message, the mobile agent super node checks in a list maintained by itself to determine whether there is the resource index information needed by the opposite party, and if yes, the mobile agent super node returns response information with a format of Reply (KeyID, PeersList) to the opposite party, otherwise, the mobile agent super node forwards the request message to other mobile agent super nodes till the needed resource index information is found.

Through this embodiment, in view of the problem of deploying P2P application in the mobile internet, a mobile internet content sharing system based on the mobile agent mechanism and P2P technology is provided. By adding an agent peer-to-peer point and a mobile agent super node, and applying the mobile agent mechanism to the mobile internet, the mobile client node establishes a mobile agent. The mobile agent peer-to-peer node copies and migrates transfers the mobile agent to the mobile agent super node. The mobile agent super node executes the mobile agent plan and returns related information to accomplish the sharing of information content in the mobile internet and enable multiple mobile terminals to be connected to the mobile internet through the P2P network. Thus, the network bandwidth is saved, the service content of the mobile internet is enriched and the experience of the user enjoying the mobile internet is enhanced. The application solution extends the application of the conventional P2P network technology to the mobile internet and, based on the mobile agent mechanism, saves a great amount of bandwidth of the mobile internet.

In the above, the mobile agent is a program that substitutes human-being or other programs to execute a task. The mobile agent can independently move from a host to another host in a heterogeneous network, and can interact with other agents or resources. The mobile agent can effectively reduce the network load in distributed computation, improve the communication efficiency, dynamically adapt to the changed network environment and have very good security and fault-tolerant capability. The mobile agent has characteristics of asynchronous task execution, network load reduction, robustness, parallel process and intelligent route.

The software architecture diagram of the mobile client, the mobile agent peer-to-peer node and the mobile agent super node are described below in detail.

Figure 3:
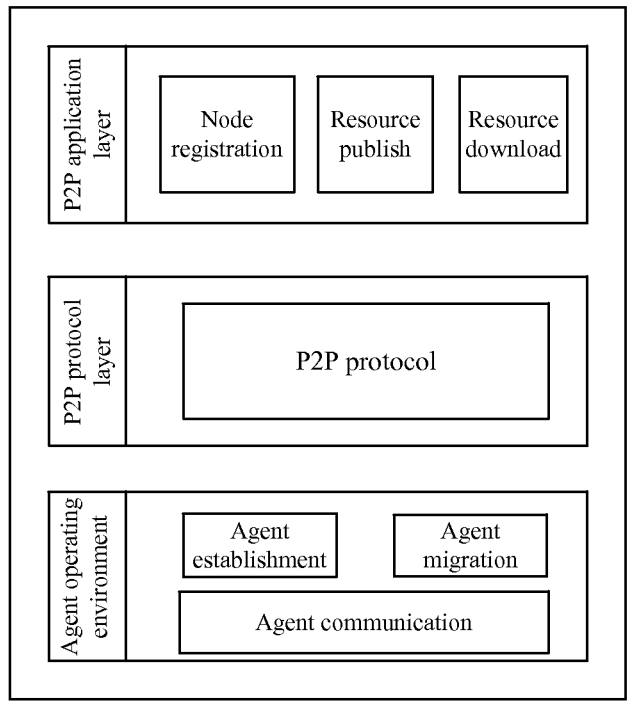
FIG. 3 shows a schematic diagram of a software architecture of a mobile client according to the embodiment of this disclosure.

FIG. 3 shows a schematic diagram of a software architecture of a mobile client (that is, a mobile client node) according to the embodiment of this disclosure. As shown in FIG. 3, the agent operating environment module mainly provides the operating environment support for the mobile agent; the agent establishment module mainly takes charge of the establishment functions of a content publication agent, an content search agent and an content download agent of the mobile client; the agent migration module mainly takes charge of moving an established agent to a mobile agent peer-to-peer node; the agent communication module mainly takes charge of the communication between the mobile client and other nodes; the P2P protocol layer organizes and routes the resource and the information of the network according to the structured P2P protocol to provide underlying network support for an upper-layer P2P application; and the P2P application layer mainly provides the functions of node registration, resource publication and resource download.

Figure 4:
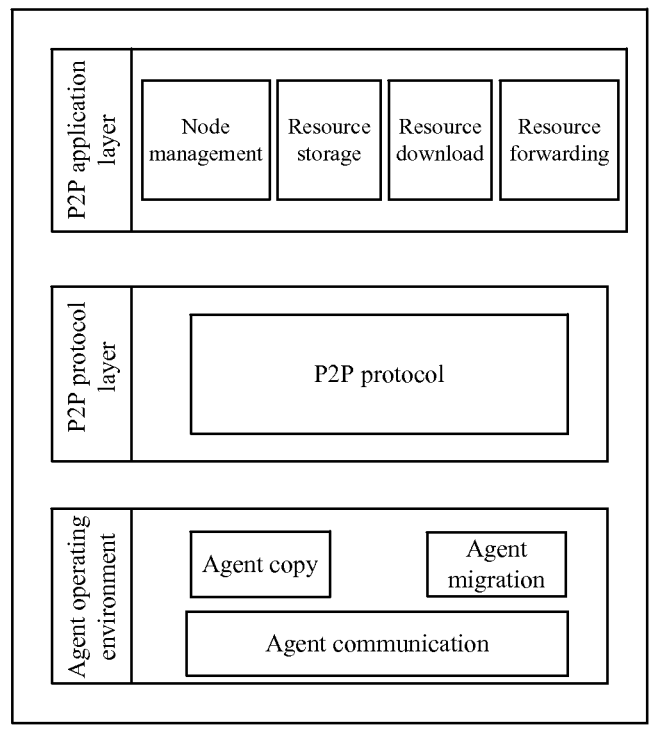
FIG. 4 shows a schematic diagram of a software architecture of a mobile agent peer-to-peer node according to the embodiment of this disclosure.

FIG. 4 shows a schematic diagram of a software architecture of a mobile agent peer-to-peer node according to the embodiment of this disclosure. As shown in FIG. 4, the agent operating environment module mainly provides the operating environment support for the mobile agent; the agent copy module mainly takes charge of the copy functions of an content publication agent, an content search agent and an content download agent of the mobile client; the agent migration module mainly takes charge of moving a copied agent to a mobile agent super node; the agent communication module mainly takes charge of the communication between the mobile agent peer-to-peer node and other nodes; the P2P protocol layer organizes and routes the resource and the information of the network according to the structured P2P protocol to provide underlying network support for the upper-layer P2P application; and the P2P application layer mainly provides the functions of node management, resource storage, resource download and resource forwarding.

Figure 5:
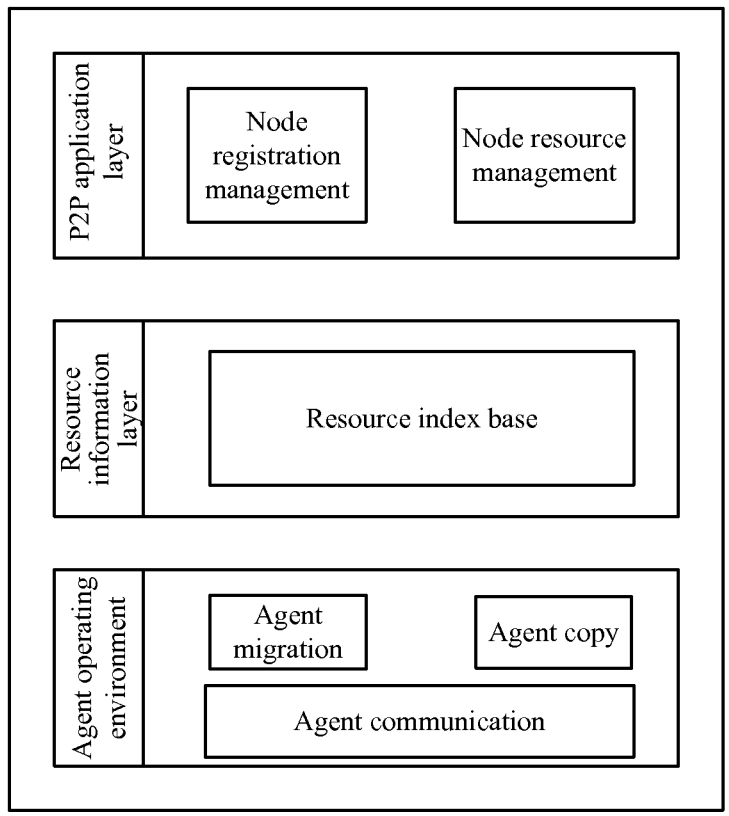
FIG. 5 shows a schematic diagram of a software architecture of a mobile agent server according to the embodiment of this disclosure.

FIG. 5 shows a schematic diagram of a software architecture of a mobile agent server (that is, the mobile agent super node above) according to the embodiment of this disclosure. As shown in FIG. 5, the agent operating environment module mainly provides the operating environment support for a mobile agent; the agent migration module mainly takes charge of moving to other mobile agent super nodes a resource search mobile agent which has not found the resource; the agent copy module mainly takes charge of copying a resource mobile agent from other mobile agent super nodes to the current mobile agent super node; the agent communication module mainly takes charge of the communication between the mobile agent server and other nodes; the P2P application layer mainly provides the functions of node registration management and node resource management; and the resource information layer mainly manages the resource information index list information provided by the current node.

Method Embodiments

Figure 6:
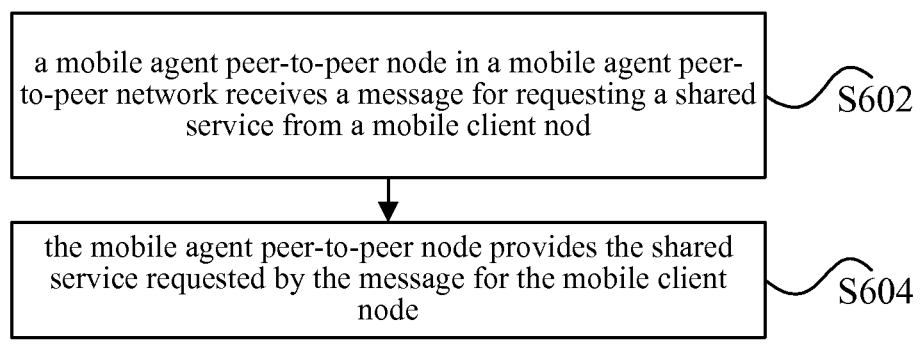
FIG. 6 shows a flowchart of a method for sharing mobile internet service according to the embodiment of this disclosure.

According to the embodiment of this disclosure, a method for sharing mobile internet service is provided. The method is used to implement the above system for sharing the mobile internet service. FIG. 6 shows a flowchart of a method for sharing mobile internet service according to the embodiment of this disclosure. As shown in FIG. 6, the method comprises the following steps.

Step 602: a mobile agent peer-to-peer node in a mobile agent peer-to-peer network receives from a mobile client node a message for requesting a shared service.

Step 604: the mobile agent peer-to-peer node provides for the mobile client node the shared service requested by the message.

In other words, the mobile agent peer-to-peer node receives a request from a mobile client node or other agent peer-to-peer points and accomplishes the functions of resource publication and resource download, wherein the mobile client node is used to realize the mobile client function. The mobile agent server (that is, the mobile agent super node above) interacts with the mobile agent peer-to-peer node or other mobile agent servers, and then the mobile client and the mobile internet content provider accomplish the functions of resource publication and resource search.

In the related art, due to the problems of network environment and capability of terminals per se, the terminals can not perform data communication with each other directly. Thus transmission and sharing of large files among mobile terminals can not be implemented. However, in the embodiment of this disclosure, by using a mobile agent peer-to-peer node to receive from a mobile client node a message for requesting a shared service and provide the shared service according to the message, multiple mobile terminals can be connected to a mobile internet network through a P2P network to realize sharing of resources.

Preferably, in the condition that the message is used request for a shared resource being published, the step of the mobile agent peer-to-peer node providing for the mobile client node the shared service requested by the message comprises the steps of: the mobile agent peer-to-peer node saving the shared resource information included in the message and sending a resource backup message to a resource node, wherein the resource backup message carries the shared resource information; the resource node receiving the resource backup message sent from the mobile agent peer-to-peer node and backuping the shared resource information in a memory space and sending the index information of the shared resource information to a mobile agent super node after the backup is successful; and the mobile agent super node receiving the index information and updating an online list of shared resources according to the index information of the resource.

Preferably, in the condition that the message is used to request to search for a shared resource, the step of the mobile agent peer-to-peer node providing for the mobile client node the shared service requested by the message comprises the steps of: the mobile agent peer-to-peer node forwarding from the mobile client node to a mobile agent super node the message for requesting to search for a shared resource; the mobile agent super node searching the shared resource information in the local resource index database according to the message; if the shared resource information is found, returning a node information list carrying the shared resource information to the mobile agent peer-to-peer node; and if the shared resource information is not found, querying other mobile agent super nodes and returning a node information list carrying the shared resource information to the mobile agent peer-to-peer node after other mobile agent super nodes return the shared resource information; and the mobile agent peer-to-peer node receiving the node information list returned from the mobile agent super node and forwarding the node information list to the mobile client node.

Preferably, in the condition that the message is used to request to download a shared resource, the step of the mobile agent peer-to-peer node providing for the mobile client node the shared service requested by the message comprises the steps of: the mobile agent peer-to-peer node, receiving from the mobile client node the message for requesting to download a shared source; and the mobile agent peer-to-peer node requesting download from a resource node possessing the shared resource according to the message, executing the download, and sending the downloaded shared resource to the mobile client node after finishing the download.

In the above, the message for requesting a shared service can be used to request to publish shared resource, to search for shared resource and to download shared resource. The flows of content publication, content search and content download in the embodiment of this disclosure are illustrated below in detail.

Embodiment 1

In the condition that the message requests to publish a shared resource, the process of publishing the shared resource comprises the steps: a mobile client node sends a request of publishing resource information to a mobile agent peer-to-peer node; the mobile agent peer-to-peer node saves the shared resource information included in the request message and backups the shared resource information in other resource storage node through an Overlay network; that is, the mobile agent peer-to-peer node sends a resource backup message to other resource nodes, wherein the resource backup message carries the shared resource information; the resource node receives the resource backup information sent from the mobile agent peer-to-peer node, opens up a storage space to backup in the storage space the shared resource information published by the mobile client node, and sends the resource index information of the shared resource information to a mobile agent super node after the backup is successful; and the mobile agent super node receives the resource index information and updates an online list (PeersList) of the shared resource according to the index information (KeyID) of the resource.

Figure 7:
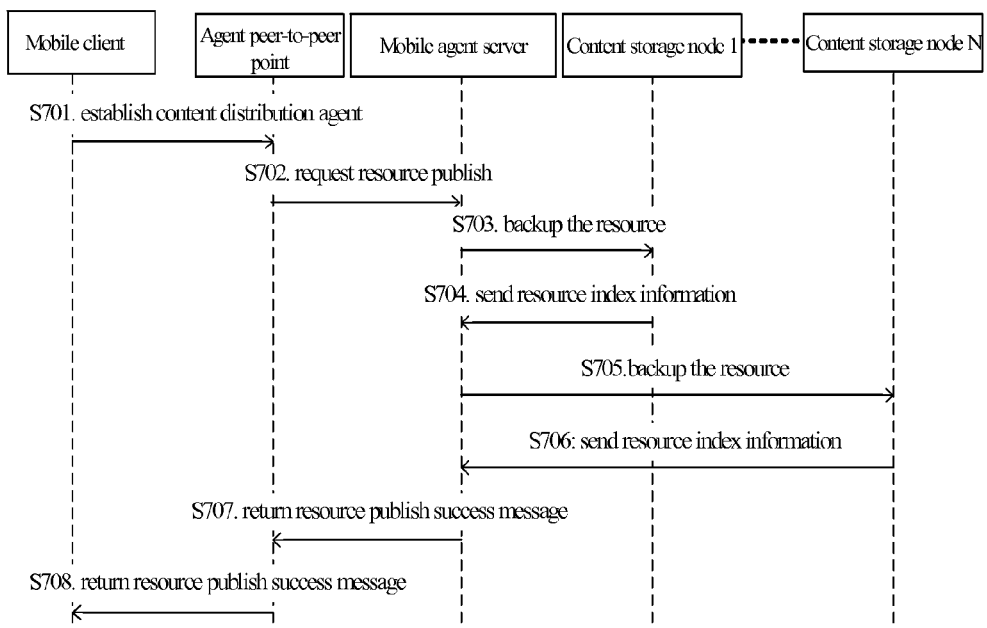
FIG. 7 shows a flowchart of content distribution according to the embodiment of this disclosure.

The process above is described below in detail in conjunction with FIG. 7. FIG. 7 shows a flowchart of content distribution according to the embodiment of this disclosure. As shown in FIG. 7, the process of content distribution comprises the following steps.

Step 701: a mobile client or a content provider establishes a content distribution mobile agent and sends to a mobile agent peer-to-peer node the resource information to be published (that is, the agent peer-to-peer point shown in FIG. 7) through the content distribution mobile agent.

Step 702: after receiving the mobile agent of publishing the resource, the mobile agent peer-to-peer node performs the resource saving process and sends the resource index information to a mobile agent super node.

Step 703: the mobile agent super node backups the resource index information in another mobile agent peer-to-peer node (that is, content storage node 1) on the internet.

Step 704: after receiving the backup resource agent, the another mobile agent peer-to-peer node (that is, content storage node 1) opens up a space to store the backup resource and sends the resource index information to a mobile agent server after the backup is successful.

Step 705: the another mobile agent peer-to-peer node (that is, content storage node 1) saves the resource and updates the resource index information onto a mobile agent super node (that is, content storage node N) to which the mobile agent peer-to-peer node is connected; that is, backup the resource information onto the content storage node N.

Step 706: after receiving the backup resource agent, the another mobile agent peer-to-peer node (that is, content storage node N) opens up a space to store the backup resource, and sends the resource index information to a mobile agent server after the backup is successful.

Step 707: the mobile agent server returns a resource publication success message to the mobile agent peer-to-peer node.

Step 708: the mobile agent peer-to-peer node returns a resource publication success message to the mobile client.

Embodiment 2

In the condition that the message requests to search for a shared resource, the process of searching for the shared resource comprises that: a mobile client node sends a request of searching resource to an agent peer-to-peer node; the mobile agent peer-to-peer node forwards from the mobile client node to a mobile agent super node the message for requesting to search for a shared resource; the mobile agent super node (that is, mobile agent server) searches for the shared resource information in the local resource index database according to the message; if the shared resource information is found, the mobile agent super node returns a node information list carrying the shared resource information to the mobile agent peer-to-peer node; and if the shared resource information is not found, that is, there isn't the shared resource information locally, the mobile agent super node searches from other mobile agent super nodes through an Overlay network and returns a node information list carrying the shared resource information to the mobile agent peer-to-peer node after other mobile agent super nodes return the shared resource information; and the mobile agent peer-to-peer node receives the node information list returned from the mobile agent super node and forwards the node information list to the mobile client node.

Figure 8:
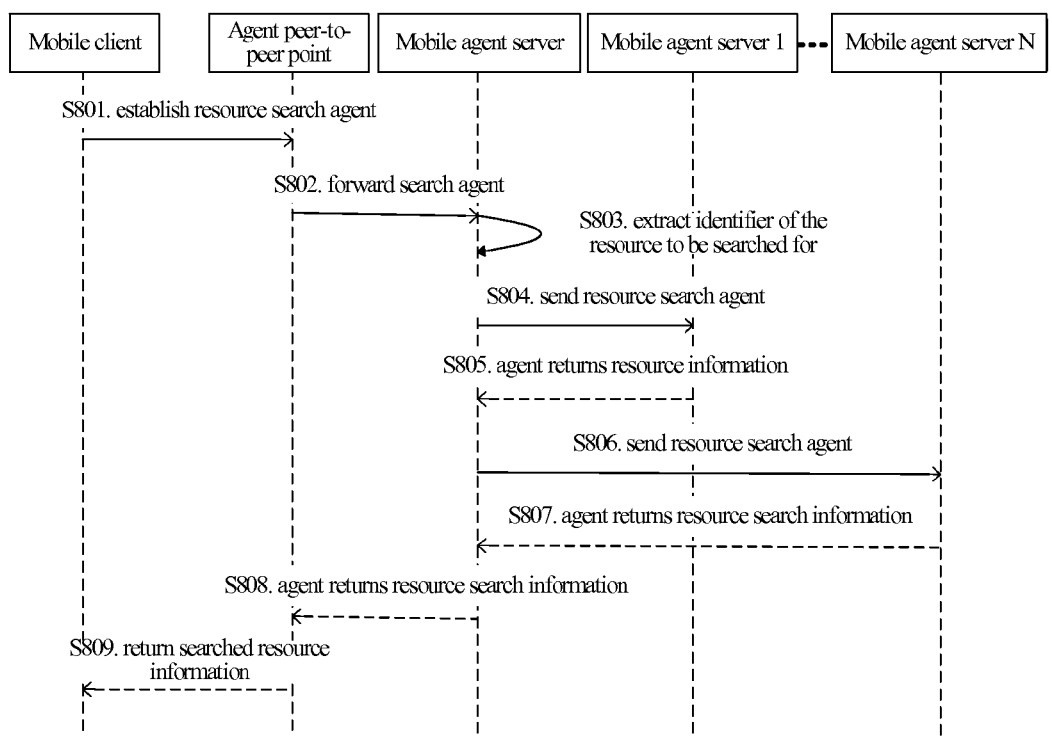
FIG. 8 shows a flowchart of content search according to the embodiment of this disclosure.

The process above is illustrated below in detail in conjunction with FIG. 8. FIG. 8 shows a flowchart of content search according to the embodiment of this disclosure. As shown in FIG. 8, the flow of content search comprises the following steps.

Step 801: a mobile client establishes a content search mobile agent and sends it to a mobile agent peer-to-peer node; that is, establish resources and search for an agent on the mobile agent peer-to-peer node.

Step 802: after receiving the content search mobile agent, the mobile agent peer-to-peer node forwards the agent to a mobile agent super node (that is, a mobile agent server).

Step 803: after receiving the content search mobile agent, the mobile agent extracts the identifier (KeyID) of the content to be searched for and searches for the resource information in the local content index database, if there is the resource information, the mobile agent sends a resource information list to a mobile client through a mobile agent peer-to-pee node; and if there isn't the mobile agent, Step 804 is executed.

Step 804: a mobile agent server forwards the resource search agent to another mobile agent super node (that is, mobile agent server 1) till the resource information is found and returned to the mobile client.

Step 805: the another mobile agent super node (that is, mobile agent server 1) returns the resource information to the mobile agent server agent.

Step 806: the mobile agent server sends the resource search agent to the mobile agent server N.

Step 807: the mobile agent server N returns the resource search information to the mobile agent server agent.

Step 808: the mobile agent server returns the resource search information to the mobile agent peer-to-peer node agent.

Step 809: the mobile agent peer-to-peer node returns the searched resource information to the mobile client.

Embodiment 3

In the condition that the message requests to download a shared resource, the process of downloading the shared resource comprises: after receiving an information list about the resource node returned from a mobile agent peer-to-peer node, a mobile client node resolves (parses) the node information and establishes a download mobile agent and sends it to an agent peer-to-peer point; the mobile agent peer-to-peer node receives from the mobile client node the message (including the mobile agent information of download) for requesting to download the shared resource; and the mobile agent peer-to-peer node requests download from a node possessing the shared resource according to the message, executes the download and sends the downloaded shared resource to the mobile client node after finishing download.

Figure 9:
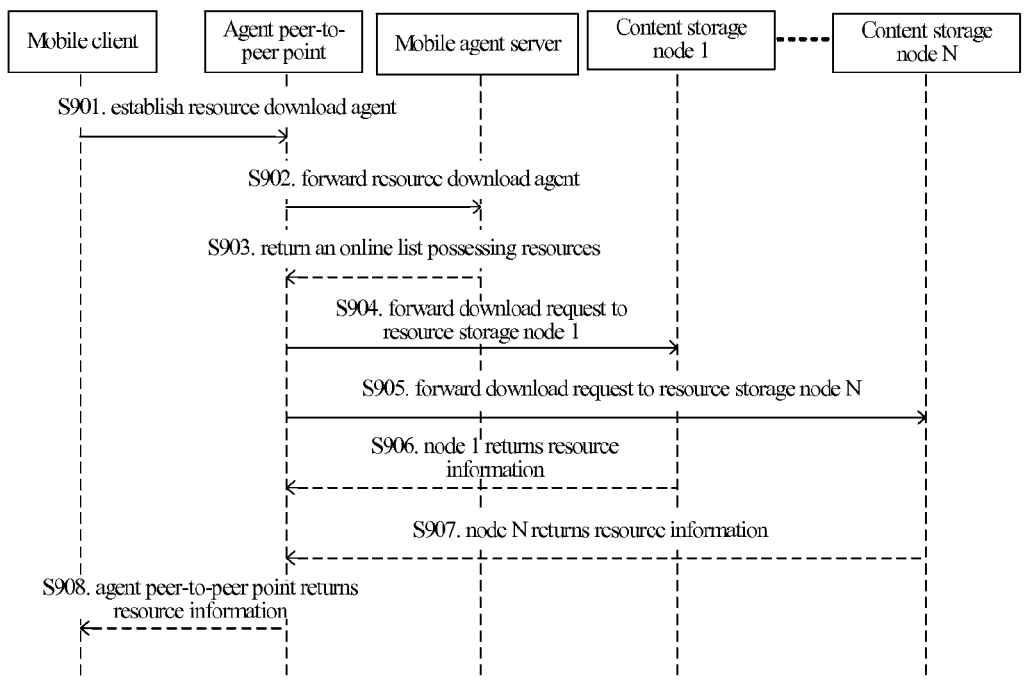
FIG. 9 shows a flowchart of content download according to the embodiment of this disclosure.

The process above is illustrated below in detail in conjunction with FIG. 9. FIG. 9 shows a flowchart of content download according to the embodiment of this disclosure. As shown in FIG. 9, the process of content download comprises the following steps.

Step 901: a mobile client establishes a content download mobile agent, that is, establishes a resource download agent on a mobile agent peer-to-peer node.

Step 902: the mobile agent peer-to-peer node forwards the resource mobile agent to a mobile agent super node (that is, a mobile agent server).

Step 903: after receiving the content download mobile agent, the mobile agent super node extracts the KeyID of the content to be downloaded and searches in the local content index database for the node list information possessing the resource; if there is the node list information, the mobile agent super node sends the node list to the mobile client through the mobile agent peer-to-peer node; and if there isn't the node list information, the mobile agent super node forwards the resource download Agent to other mobile agent super nodes till the node information list possessing the resource is found and returned to the mobile agent peer-to-peer node.

Step 904: the mobile agent peer-to-peer node resolves the node information list returned from the agent server and sends a download request to each resource storage node, for example, forwards a download request to the resource storage node 1.

Step 905: as a preferred mode, the mobile agent peer-to-peer node also can forward the download request to the resource storage node N.

After that, after receiving the download request, the resource storage node sends related resources to the mobile agent peer-to-peer node.

Step 906: the resource storage node 1 returns resource information to the mobile agent peer-to-peer node.

Step 907: the resource storage node N returns resource information to the mobile agent peer-to-peer node.

Step 908: after finishing downloading resources, the mobile agent peer-to-peer node sends the resources to the mobile client; then, the mobile client finishes the download of resources.

Through the embodiments of this disclosure, a system and a method for sharing mobile internet content based on the mobile agent and P2P technology are provided. In view of the problem on how to apply the mobile agent mechanism and P2P technology to the mobile internet, a solution is provided. Thus multiple mobile terminals can be connected to the mobile internet network through a P2P network. And based on the mobile agent mechanism, the network bandwidth of the mobile internet is saved, the service content of the mobile internet is enriched and the experience of the user enjoying the mobile internet is enhanced.

Obviously, those skilled in the art should understand that the modules and steps described above can be implemented by a common computer device; the modules or steps can be integrated on a single computing device or distributed on a network composed of a plurality of computing devices; optionally, the modules or steps can be implemented by a programming code executable by a computing device, thus they can be stored in a storage device to execute by a computing device, and in some conditions executed in a different order, or manufactured into individual integrated circuit module respectively, or several of them are manufactured into a single integrated circuit module to realize; in this way, this disclosure is not limited to any combination of specific hardware and software.

The above are only the preferred embodiments of this disclosure and are not intended to limit this disclosure. For those skilled in the art, various modifications and changes can be made to this disclosure. Any modification, equivalent substitute and improvement within the spirit and principle of this disclosure are deemed to be included within the scope of this disclosure.

What is claimed is:

1. A system for sharing mobile internet service, comprising:
    a mobile client node, configured to send a message for requesting a shared service; and
    a mobile agent peer-to-peer network, including multiple mobile agent peer-to-peer nodes, and configured to receive the message sent from the mobile client node and to provide for the mobile client node the shared service requested by the message;
    wherein, in a condition that the message is used to request to publish a shared resource, the step of the mobile agent peer-to-peer node providing for the mobile client node the shared service requested by the message comprises steps of:
        the mobile agent peer-to-peer node saving shared resource information included in the message and sending a resource backup message to a resource node, wherein the resource backup message carries the shared resource information;
        the resource node receiving the resource backup message sent from the mobile agent peer-to-peer node, backing up the shared resource information in a memory space, and after the backup is successful, sending index information of the shared resource information to a mobile agent super node; and
        the mobile agent super node receiving the index information and updating an online list of shared resources according to the index information of the shared resource information;
    wherein the mobile agent peer-to-peer network further comprises:
        mobile agent super nodes, configured to receive the request message including the index information of the shared resource corresponding to the shared service from a mobile agent peer-to-peer node and to provide the index information of the shared resource corresponding to the shared service to the mobile agent peer-to-peer node, wherein the index information includes a file name and a file Hash value;

wherein the mobile agent super node is further configured to obtain the index information of the shared resource corresponding to the shared service from another mobile agent super node in the mobile agent peer-to-peer network, and to provide the obtained index information to the mobile agent peer-to-peer node; and wherein the mobile agent peer-to-peer node is further configured to obtain the shared service from a resource node according to the index information provided by the mobile agent super node.

2. The system according to claim 1, wherein the resource node includes at least one of: mobile client node, mobile agent peer-to-peer node and other peer-to-peer nodes.

3. The system according to claim 2, wherein the shared service includes at least one of: distribution of shared resource, search of shared resource and download of shared resource.

4. The system according to claim 1, wherein the shared service includes at least one of: distribution of shared resource, search of shared resource and download of shared resource.

5. The system according to claim 1, wherein the mobile agent super node is further configured to maintain information of the mobile client node and the mobile agent peer-to-peer node according to a Distributed Hash table (DHT), in which the DHT is configured to provide communication information of the mobile client node and the mobile agent peer-to-peer node.

6. The system according to claim 5, wherein the shared service includes at least one of: distribution of shared resource, search of shared resource and download of shared resource.

7. The system according to claim 1, wherein the shared service includes at least one of: distribution of shared resource, search of shared resource and download of shared resource.

8. The system according to claim 1, wherein the shared service includes at least one of: distribution of shared resource, search of shared resource and download of shared resource.

9. A method for sharing mobile internet service, comprising steps of:

receiving, by a mobile agent peer-to-peer node in a mobile agent peer-to-peer network, from a mobile client node a message for requesting a shared service; and the mobile agent peer-to-peer node providing for the mobile client node the shared service requested by the message;

wherein, in a condition that the message is used to request to publish a shared resource, the step of the mobile agent peer-to-peer node providing for the mobile client node the shared service requested by the message comprises steps of:

the mobile agent peer-to-peer node saving shared resource information included in the message and sending a resource backup message to a resource node, wherein the resource backup message carries the shared resource information;

the resource node receiving the resource backup message sent from the mobile agent peer-to-peer node, backing up the shared resource information in a memory space, and after the backup is successful, sending index information of the shared resource information to a mobile agent super node; and the mobile agent super node receiving the index information and updating an online list of shared resources according to the index information of the shared resource information;

wherein the mobile agent peer-to-peer network further comprises:

mobile agent super nodes, configured to receive the request message including the index information of the shared resource corresponding to the shared service from a mobile agent peer-to-peer node and to provide the index information of the shared resource corresponding to the shared service to the mobile agent peer-to-peer node, wherein the index information includes a file name and a file Hash value;

wherein the mobile agent super node is further configured to obtain the index information of the shared resource corresponding to the shared service from another mobile agent super node in the mobile agent peer-to-peer network, and to provide the obtained index information to the mobile agent peer-to-peer node; and wherein the mobile agent peer-to-peer node is further configured to obtain the shared service from a resource node according to the index information provided by the mobile agent super node.

10. The method according to claim 9, wherein in a condition that the message is used to request to search for a shared resource, the step of the mobile agent peer-to-peer node providing for the mobile client node the shared service requested by the message comprises steps of:

forwarding from the mobile client node to a mobile agent super node, by the mobile agent peer-to-peer node, the message for requesting to search for a shared resource;

searching, by the mobile agent super node, for the shared resource information in a local resource index database according to the message; if the shared resource information is found, returning a node information list carrying the shared resource information to the mobile agent peer-to-peer node; and if the shared resource information is not found, querying other mobile agent super nodes and returning a node information list carrying the shared resource information to the mobile agent peer-to-peer node after the other mobile agent super nodes return the shared resource information; and the mobile agent peer-to-peer node receiving the node information list returned from the mobile agent super node and forwarding the node information list to the mobile client node.

11. The method according to claim 9, wherein in a condition that the message is used to request to download a shared resource, the step of the mobile agent peer-to-peer node providing for the mobile client node the shared service requested by the message comprises steps of:

the mobile agent peer-to-peer node receiving from the mobile client node the message for requesting to download a shared source; and the mobile agent peer-to-peer node requesting download from a resource node possessing the shared resource according to the message, executing the download, and after finishing the download, sending the downloaded shared resource to the mobile client node.

* * * * *